(12) United States Patent
Mao et al.

(10) Patent No.: US 7,469,061 B2
(45) Date of Patent: Dec. 23, 2008

(54) METHOD OF PHOTO/TEXT SEPARATION IN AN IMAGE

(75) Inventors: Ching-Lung Mao, Taipei (TW); Shun-Yen Yao, Taipei (TW); Fu-Wen Lee, Taipei (TW)

(73) Assignee: Primax Electronics Ltd., Taipei (TW)

( * ) Notice: Subject to any disclaimer, the term of this patent is extended or adjusted under 35 U.S.C. 154(b) by 1014 days.

(21) Appl. No.: 10/834,255

(22) Filed: Apr. 29, 2004

(65) Prior Publication Data

US 2005/0244056 A1 Nov. 3, 2005

(51) Int. Cl.
*G06K 9/34* (2006.01)
(52) U.S. Cl. .................................... 382/176; 382/270
(58) Field of Classification Search ............... 382/176, 382/173, 164, 175, 270; 358/1.9, 1.2, 502, 358/504, 529, 434, 483, 461, 475
See application file for complete search history.

(56) References Cited

U.S. PATENT DOCUMENTS

| 4,879,753 | A | * | 11/1989 | El-Sherbini | .............. | 382/270 |
| 7,023,584 | B2 | * | 4/2006 | Cowan et al. | .............. | 358/1.9 |
| 7,375,864 | B2 | * | 5/2008 | Kanno | .............. | 358/483 |

* cited by examiner

*Primary Examiner*—Anh Hong Do
(74) *Attorney, Agent, or Firm*—Rabin & Berdo, P.C.

(57) ABSTRACT

A method of photo/text separation, which includes converting a document image into a plurality of source color planes, setting a source color consecutive point threshold (Tc), performing an intensity/color operation for each of the source color planes, and assigning photo/text types to the document image according to a connected length density threshold (Td) and a result of the intensity/color operation.

10 Claims, 4 Drawing Sheets

METHOD OF PHOTO/TEXT SEPARATION IN AN IMAGE

BACKGROUND OF THE INVENTION

1. Field of Invention

The invention relates to an image processing method and, in particular, to a method that separates photo/text from a document image using their color/intensity properties.

2. Related Art

In the coming digital era, the document image analysis technology has been widely used in processing digital images, such as identifying license plates, fingerprints, military satellite pictures, scanners, printers, words, and digital data. The quality and accuracy of the document image analysis technology directly affect the results of subsequent processing and whether one can save a lot of time and space. It can even affect the processing capability of the whole system. Therefore, all document image analysis techniques achieving similar functions are hopefully to find a method that can correctly and rapidly identify a document image.

Most of the current document image analyses focus on the text separation technique. Since most users select to use a source color or grey level as the color for text display, the color settings in text document are simpler. The research and development in text separation techniques are thus earlier and more complete. Nowadays, researches in text separation techniques are still focused on: using local grey-level statistics and the property that objects have concentrated grey-level energy to analyze a document image. For example, the methods of identifying text data in a black-and-white (BW) image remove extra information of each word to find representative stable parameters for text identification. In order to single out Chinese or English text from a document image with mixed Chinese and English, the user does not need to select one by one. The current document image analysis technique researches even include the identification of italic words, speeding up the identification speed and the accuracy.

Because of the advance in digitized information, most document images include text and photos in pure or mixed colors. As described above, the techniques in the prior art often focus only on grey-level document images; therefore, they are not suitable for those with text and photos in pure or mixed colors. It is not useful for subsequent processing. For example, when a color printer prints a document image with text in a source color and photos in mixed colors, the conventional document image analysis techniques are not very sensitive to the edges of source-color text data (e.g., black) and thus consider the source-color text as mixed-color photo data. Consequently, the printer has to use inks of the CMY colors to print even when printing a source-color text document. This does not only waste the color inks, the ink mixture also slows down the printing speed. The net effect on the printed text is only a mixture of three color inks, close to a source color but not exactly a source color. One therefore obtains a printed document image with color distortion, which is not allowed for research results that use different colors to represent numerical data.

In summary, the convention methods of using the property of concentrated grey-level energy to process document images are not sensitive to and thus not suitable for the identification of pure and mixed color data.

It is desirable to provide a photo/text separation method that can separate source-color and mixed-color data. Not only can it save processing time, it also reduces the waste of color inks.

SUMMARY OF THE INVENTION

In view of the foregoing, the invention provides a method of photo/text separation in an image to identify the photo/text types in a document image.

A main technical feature of the invention is to utilize that each source color has a specified color and intensity range in the spectrum to individually extract the photo/text types in the document image.

To achieve the above-mentioned objective, the disclosed method includes the steps of: converting a document image into individual source color planes, establishing a source color consecutive point threshold (Tc) and performing an intensity/color operation for each source color plane; and setting the photo/text types in the document image according to a connected length density threshold (Td) and the intensity operation result.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

The disclosed method of photo/text separation in an image uses the specified color and intensity range of each source color in the spectrum to convert a document image into individual source color planes. The photo/text types in the document image are distinguished by performing a color/intensity operation on each source color plane.

Figure 1:
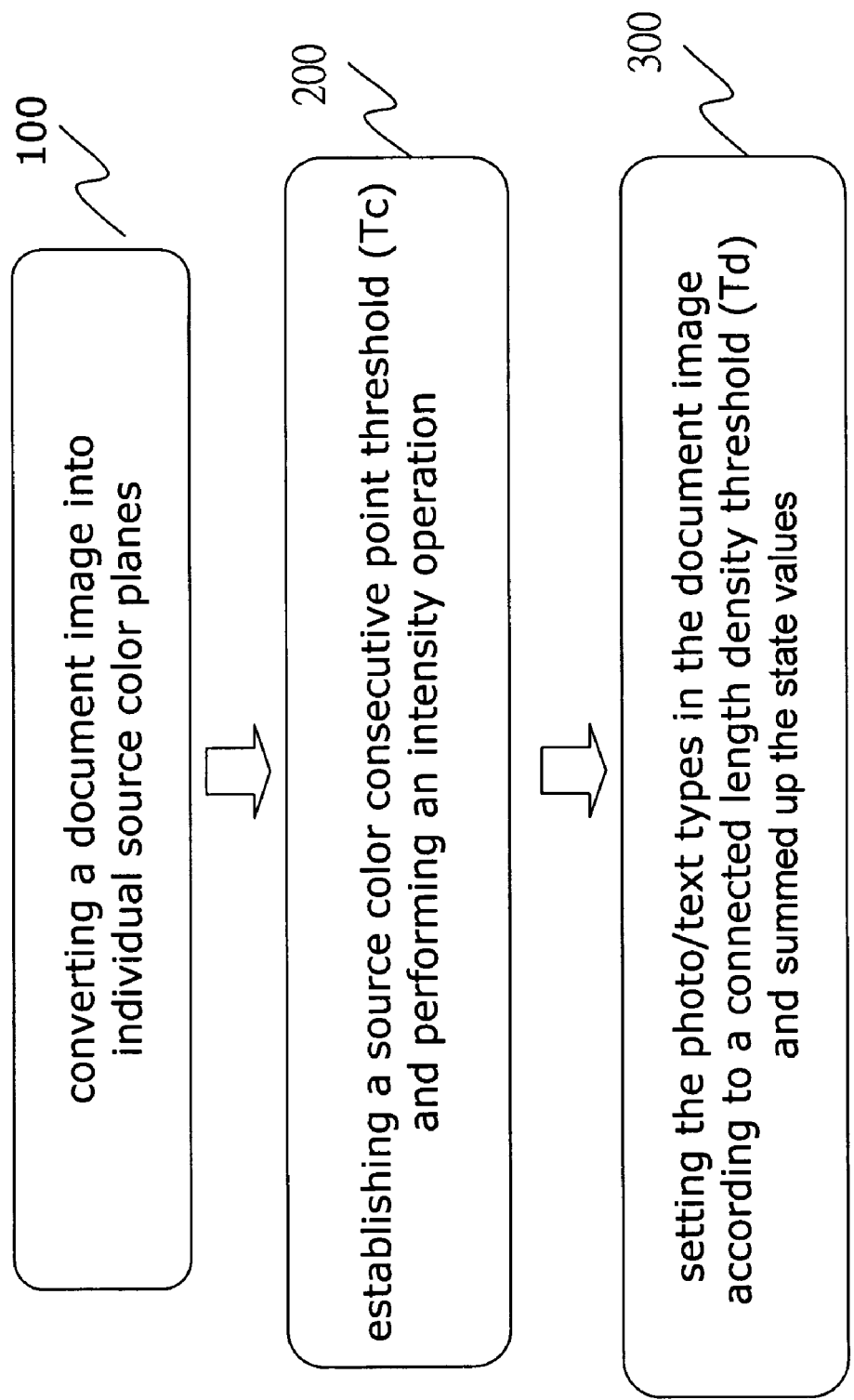
FIG. 1 is a flowchart of the method of photo/text separation according to a first embodiment of the invention.

We show the main procedure of a first embodiment of the invention in FIG. 1. First, a document image is converted into source color planes with separated color and intensity information. In particular, the recording modes of the color and intensity information can be YCC, YUV, YIQ, HIS, or HSV. The corresponding source color planes are Y.Cr.C v, Y.U.V, Y.I.Q, H.I.S, or H.S.V, respectively. In the current embodiment, we use the YCC color mode as example to record the document image and to convert it into the Y.Cr.Cv source color plane (step 100). Afterwards, a source color consecutive point threshold (Tc) is established for executing intensity operations on each source color plane, where Tc is used to confirm the number of consecutive source color pixels. Therefore, the magnitude of Tc is proportional to the accuracy of the source color pixels (step 200). Finally, the photo/text types in the document image are determined according to a connected length density threshold (Td) and the intensity operation result.

If each pixel section in each source color plane after the intensity operation result is not smaller than Td, then the pixel section is considered to be source color data. Otherwise, it is considered to be photo data. Since most users have a source-color setting and a mixed-color setting for displaying text and photos, respectively, the invention thus has the function of considering source-color pixel sections as text and mixed-color pixel sections as photos (step 300).

Figure 2:
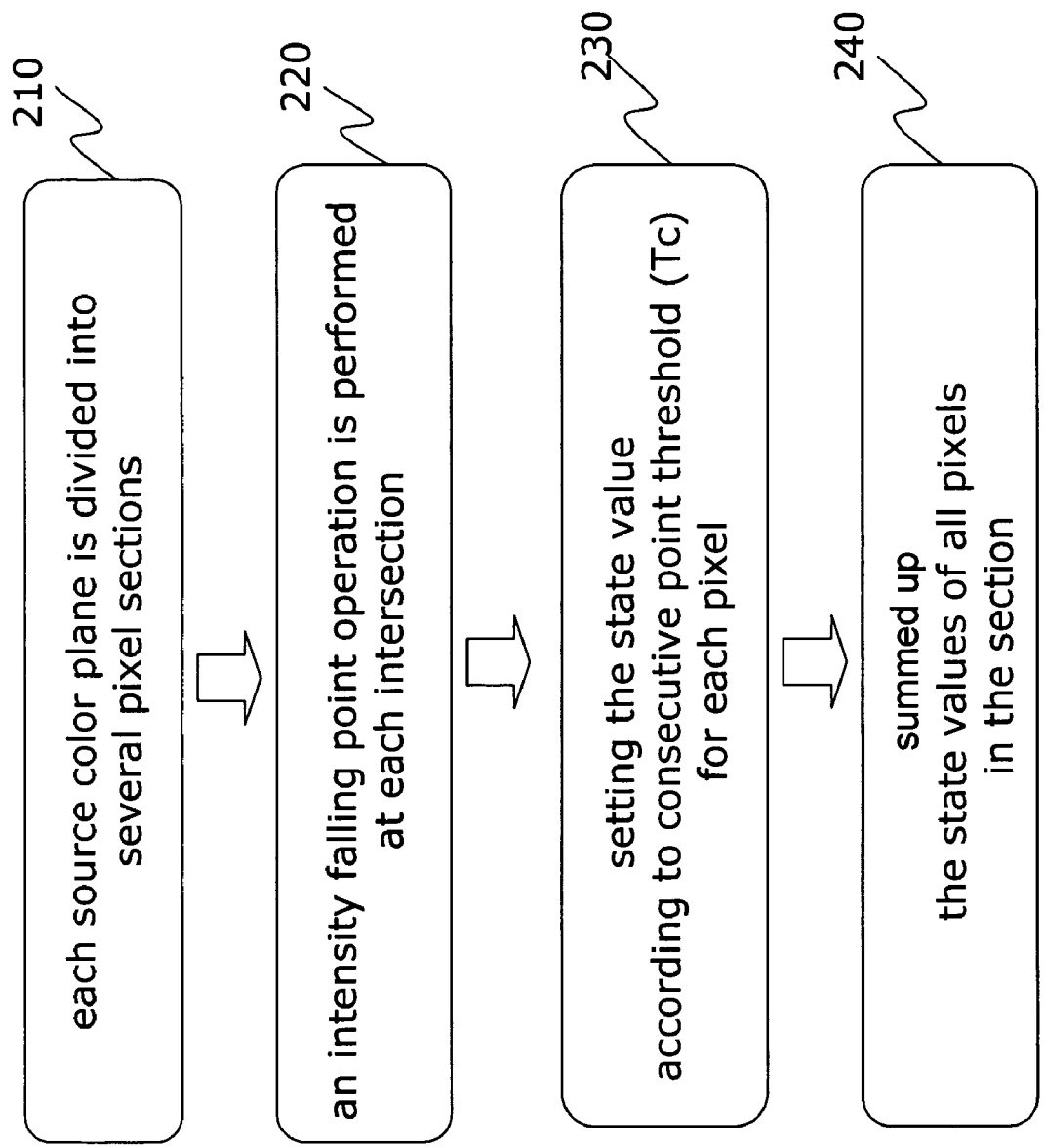
FIG. 2 is the intensity operation procedure of the first embodiment.

FIG. 2 shows the intensity operation procedure mentioned in the first embodiment. In this subroutine, each source color plane is divided into several pixel sections (n×n windows).

Each pixel section is comprised of many vertical columns (X1 to Xn) and many horizontal rows (Y1 to Yn). For example, each of the Y color plane, the Cr color plane, and the Cv color plane in the Y.Cr.Cv source color plane is divided into many pixel sections (n×n windows) Each pixel section has n vertical columns (X1 to Xn) and n horizontal rows (Y1 to Yn) (step 210). Afterwards, a intensity falling point operation is performed at each intersection ((X1,Y1) . . . (Xn,Yn−1) . . . (Xn,Yn)). The intensity falling point operation obtains a pixel at each of the intersections and its intensity. According to different source color ranges in each source color plane, the method finds the number of source color pixels whose intensities fall within the source color range. For example, in the Y.Cr.Cv source color plane, Y represents the brightness-graylevel signal, Cr the red-green chromatism, and Cv the yellow-blue chromatism. Therefore, the source color range in the Y source color plane is used to identify black and white source color pixels. The source color range in the Cr source color plane is used to identify red and green source color pixels. The source color range in the Cv source color plane is used to identify yellow and blue source color pixels (step 220). When confirming each source color pixel, the method checks whether the consecutive pixels are also source color pixels.

If the consecutive pixels are also source color ones and the number is not smaller than a predetermined source color consecutive point threshold (Tc), then the method generates a corresponding state value (gaining one point), and repeats the above steps for unchecked source color pixels in the pixel section. Otherwise, the source color pixels are considered as mixed-color pixels with no point gained (step 230). Finally, the state values of all pixels in the section are summed up. If the total point is not smaller than a predetermined connected length density threshold (Td), then the pixel section is considered as source color data (step 240).

As described above, after completing the comparison between the summed state value and the connected length density threshold (Td) for each pixel section, one then obtains the ranges of pixel sections with source-color and mixed-color data in each source color plane. If a pixel section is considered as source-color data, it is also considered as having text data. If a pixel section is considered as mixed-color data, it is also considered as having photo data. We thus obtain the photo/text distribution in the document image.

The invention can be used in a color printed. Once the comparison between the summed state value and Td is completed, the source color planes are recombined to determine the pixel sections with source-color data and their actual colors according to the source color range covered by the source color planes. For example, for the source color pixel section in the Y plane of the Y.Cr.Cv source color plane, one only needs to perform monochromatic printing. Therefore, it can save color ink and time for mixing colors. The invention can indeed the goal of avoid chromatism.

Figure 3:
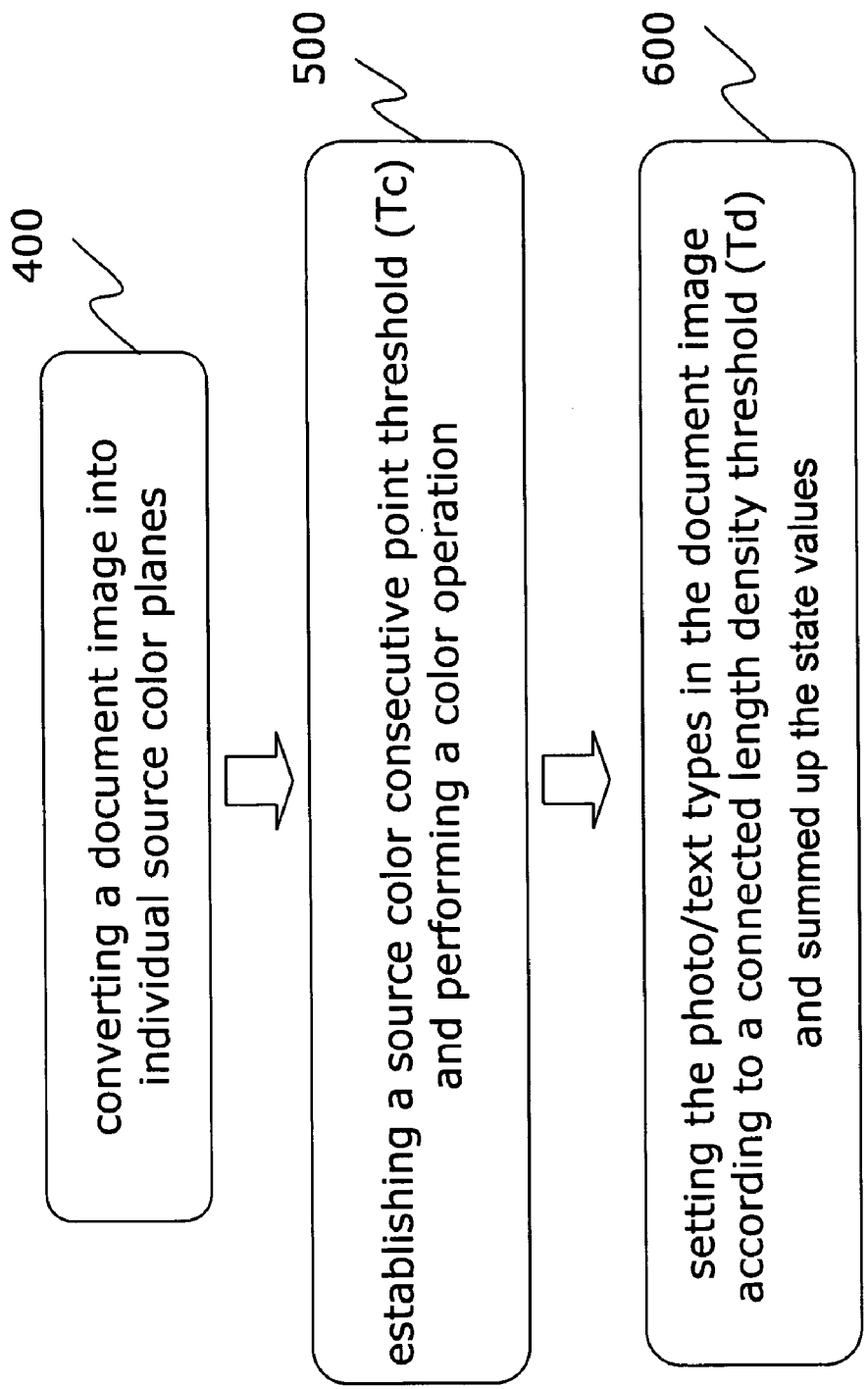
FIG. 3 is a flowchart of the method of photo/text separation according to a second embodiment of the invention.
Figure 4:
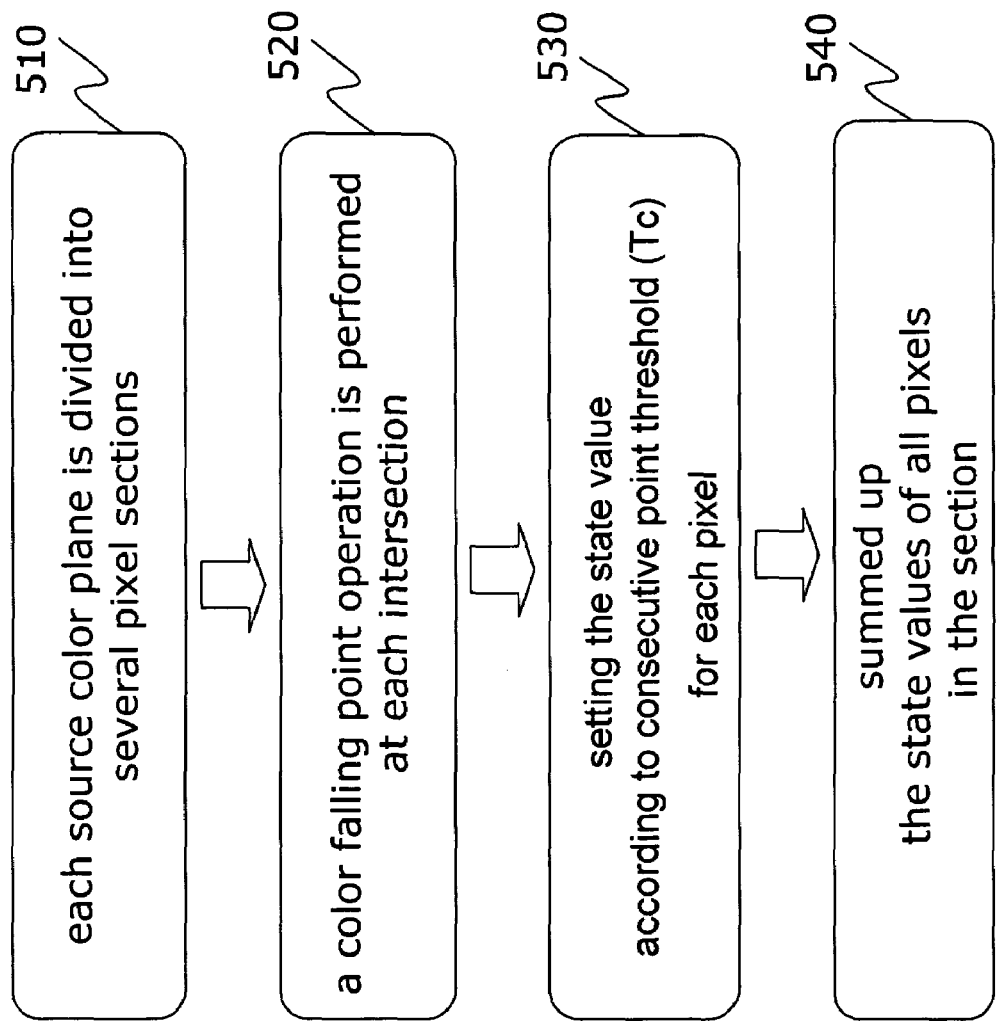
FIG. 4 is the color operation procedure of the second embodiment.

FIGS. 3 and 4 show a second embodiment of the disclosed method. Its main difference from the first embodiment is that each source color in the spectrum has its specified color range. Therefore, the second embodiment uses the colors as the standards to identify source color pixels and can be used for document images that use colors to record information. For example, document images recorded in the RGB and CMYK color modes are converted into the corresponding R.G.B and C.M.Y.K source color planes. Other aspects are the same as the first embodiment and not repeated here.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A method of photo/text separation of a document image, comprising the steps of:
    converting the document image into a plurality of source color planes;
    setting a source color consecutive point threshold (Tc),
    performing an intensity operation for each of the source color planes, including (1) dividing each of the source color planes into a plurality of pixel sections, each section being a square window of pixels; (2) performing an intensity falling point operation for the pixels in each of the pixel sections, (3) setting a state value for each of the pixels in each of the pixel sections, according to the set source color consecutive point threshold (Tc), and (4) accumulating the state values of the pixels in each of the pixel sections; and
    assigning photo/text types to the document image according to a connected length density threshold (Td) and a result of the intensity operation.

2. The method of claim 1, wherein the document has a color mode selected from the group consisting of YCC, YUV, YIQ, HIS, and HSV.

3. The method of claim 1, wherein the setting a state value comprises setting the state value of a select pixel as one when consecutive pixels of the select pixel in the pixel section of the select pixel are source color pixels and the number of the consecutive pixels is not smaller than Tc.

4. The method of claim 1, wherein the step of assigning the photo/text types to the document image according to Td comprises the step of assigning the pixel section in the document image as text data when the accumulated state value is not smaller than Td.

5. The method of claim 1, wherein the step of assigning the photo/text types to the document image according to Td comprises the step of assigning the pixel section in the document image as photo data when the accumulated state value is smaller than Td.

6. A method of photo/text separation of a document image, comprising the steps of:
    converting the document image into a plurality of source color planes;
    setting a source color consecutive point threshold (Tc);
    performing a color operation on each of the source color planes, including (1) dividing each of the source color planes into a plurality of pixel sections, each pixel section being a square windows of pixels, (2) performing a color falling point operation for the pixels in each of the pixel sections, (3) setting a state value for each of the pixels in each of the pixel sections according to the set source color consecutive point threshold (Tc), and (4) accumulating the state values of the pixels in each pixel section; and
    assigning the photo/text types to the document image according to a connected length density threshold (Td) and a result of the color operation.

7. The method of claim 6, wherein the document has a color mode selected from the group consisting of, RGB and CMYK.

8. The method of claim 6, wherein the setting a state value comprises setting the state value of a select pixel as one when consecutive pixels of the select pixel in a pixel section of the select pixel are source color pixels, and the number of the consecutive pixels is not smaller than Tc.

9. The method of claim 6, wherein the step of assigning the photo/text types to the document image according to Td comprises the step of assigning the pixel section in the document image as text data when the accumulated state value is not smaller than Td.

10. The method of claim 6, wherein the step of assigning the photo/text types to the document image according to Td comprises the step of assigning the pixel section in the document image as photo data when the accumulated state value is smaller than Td.

* * * * *